(12) United States Patent
Ruff (10) Patent No.: US 9,922,782 B2
(45) Date of Patent: Mar. 20, 2018

(54) SWITCHING DEVICE FOR A RADIO PUSHBUTTON, RADIO PUSHBUTTON, AND METHOD FOR PRODUCING A SWITCHING SIGNAL OF A SWITCHING DEVICE

(71) Applicant: ZF Friedrichshafen AG, Friedrichshafen (DE)

(72) Inventor: Eduard Ruff, Auerbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 274 days.

(21) Appl. No.: 14/897,955

(22) PCT Filed: May 12, 2014

(86) PCT No.: PCT/EP2014/059599
§ 371 (c)(1),
(2) Date: Dec. 11, 2015

(87) PCT Pub. No.: WO2014/198471
PCT Pub. Date: Dec. 18, 2014

(65) Prior Publication Data
US 2016/0148764 A1    May 26, 2016

(30) Foreign Application Priority Data

Jun. 13, 2013 (DE) ........................ 10 2013 211 015

(51) Int. Cl.
*H01H 13/64* (2006.01)
*G08C 17/02* (2006.01)
(Continued)

(52) U.S. Cl.
CPC ............ *H01H 13/64* (2013.01); *G08C 17/02* (2013.01); *H01H 9/0271* (2013.01);
(Continued)

(58) Field of Classification Search
CPC ...... Y04B 20/14; Y02B 9/224; Y02B 90/224; G08C 2201/11; G08C 17/02; H01H 14/14; H01H 9/0271; H01H 9/168
See application file for complete search history.

(56) References Cited

FOREIGN PATENT DOCUMENTS

| EP | 1 473 748 A1 | 11/2004 |
| WO | WO 2011/128598 A1 | 10/2011 |
| WO | WO 2013/053565 A1 | 4/2013 |

OTHER PUBLICATIONS

International Search Report dated Jul. 31, 2014 in International Application No. PCT/EP2014/059599, English and German languages (11 pp.).

*Primary Examiner* — Robert Deberadinis
(74) *Attorney, Agent, or Firm* — Brinks Gilson & Lione (57) ABSTRACT

The current embodiments provide a switch device for a wireless pushbutton, wherein the switch device comprising an energy conversion mechanism, a signal output mechanism, an actuation device, and a plurality of encoding contacts. The actuation device may be configured to establish contact with at least one of the plurality of encoding contacts when a first quantity of an actuation force is applied for generating an encoded signal. The actuation device may be configured to activate the energy conversion mechanism to generate energy when a second quantity of an actuation force greater than the first quantity is applied to the activation device. The signal output mechanism may be configured to transmit a wireless output signal using the encoded signal when the energy conversion mechanism is activated.

20 Claims, 6 Drawing Sheets

(51) Int. Cl.
*H01H 9/02* (2006.01)
*H01H 23/14* (2006.01)
*H01H 13/14* (2006.01)
*H01H 9/16* (2006.01)

(52) U.S. Cl.
CPC .......... *H01H 13/14* (2013.01); *H01H 23/143* (2013.01); *G08C 2201/11* (2013.01); *H01H 9/168* (2013.01); *H01H 2239/076* (2013.01); *H01H 2300/03* (2013.01); *Y02B 90/224* (2013.01); *Y04S 20/14* (2013.01)

SWITCHING DEVICE FOR A RADIO PUSHBUTTON, RADIO PUSHBUTTON, AND METHOD FOR PRODUCING A SWITCHING SIGNAL OF A SWITCHING DEVICE

This application is a filing under 35 U.S.C. § 371 of International Patent Application PCT/EP2014/059599, filed May 12, 2014, and claims the priority of German Patent Application 10 2013 211 015.4, filed Jun. 13, 2013. These applications are incorporated by reference herein in their entireties.

The current embodiments relate to a switch device for a wireless pushbutton, a wireless pushbutton, and a method for generating a switching signal of a switch device, in particular in the field of home technology for surface installation.

Wireless pushbuttons are used in particular in home technology, as a decorative solution for example. For each wireless pushbutton, a potential plurality of loads can be activated for each switching signal, such as lamps, blinds, and suchlike. DE 28 43 891 A1, which is incorporated herein in its entirety, discloses an electrical device for installation, such as a switch or pushbutton.

With this background, the current embodiments provide an improved switch device for a wireless pushbutton, an improved wireless pushbutton, and an improved method for generating a switching signal of a switch device in accordance with the main Claims. Advantageous designs can be derived from the dependent Claims and the following description.

In accordance with the current embodiments, an advantageous switch device, or an advantageous switch module, for a self-sufficient wireless pushbutton for building technology can be provided, and a switching signal can be advantageously generated by means of this switch device. In particular, a switching mechanism of the switch device enables, instead of a parallel actuation of encoding contacts and energy converters, a series connection of encoding contacts and energy converters in an advantageous manner, wherein an actuation force for actuating the encoding contacts is lower than an actuation force for actuating the energy converter.

Advantageously, in accordance with the current embodiments, in particular due to the series connection of the encoding contacts and energy converters, a requirement for a highly precise tolerance design and fine adjustment of individual components can be avoided. At least one encoding contact, in particular, can remain activated thereby during an activation of the energy converter, such that a complex, time-consuming coordination of movements of the various actuation means is not necessary. In accordance with the current embodiments, a switch device, in particular for multiple, or universal applications, in conjunction with a plurality of designs for a wireless pushbutton, e.g. in the form of a simple or multi-function light pushbutton, or light switch, respectively, or a switch for blinds having a divided or undivided button, can be provided. In accordance with the current embodiments, installation systems or installation elements having wireless control for various access options on different loads can be implemented, in particular a wireless pushbutton, or wireless switch, respectively, having numerous switching functions.

In particular, in accordance with the current embodiments, disadvantages of many typical switch devices, or switch modules, respectively, can be avoided, which, among other things, are so complicated that, by way of example, an actuation of each of two moving levers is initiated, which activate, in each case an electromagnetic energy converter. With such switch modules, a housing can typically have a rigid form, and require a certain free space under a pushbutton in order to avoid a collision during a tilting movement of the pushbutton. At the same time, with a supplementary element of the pushbutton, one of four, for example, encoding switches is actuated. An energy impulse is generated during the actuation and converted in an electronic module, as a function of the already actuated encoding switch, to a wireless signal, and transmitted by radio signals. A switch module of this type has, however, disadvantages in relation to the encoding contact actuation. Encoding switches, which are located on a printed circuit board inside the switch module, are to be actuated with a supplementary element of the pushbutton at the same time to activate the energy converter. This requires a fine adjustment and very precise tolerances in the system, which, precisely, can be avoided in accordance with the current embodiments. Furthermore, with many conventional switch modules, an actuation pushbutton can have a divided design, in the case of use in conjunction with a double switch, and an expandability of such a system can be limited to a maximum of two four-way switches with two actuation pushbuttons in one device, for example, which can likewise be avoided in accordance with the current embodiments.

The current embodiments relate to a switch device for a wireless pushbutton, wherein the switch device includes an energy conversion mechanism, a signal output mechanism, actuation means, and a plurality of encoding contacts, characterized in that the actuation means are designed to establish a contact with at least one of a plurality of encoding contacts in an encoding setting, in an actuation procedure of the switch device through the application of a first quantity of an actuation force, in order to provide an encoded signal, and when a second quantity of the actuation force is applied, which is greater than the first quantity, to activate the energy conversion mechanism in an activation setting, in order to generate an energy, wherein the signal output mechanism is designed to emit a wireless switching signal using the encoded signal and the energy.

The switch device can also be referred to as a switch module. The switch device can include mechanical components and electrical components for generating, or creating, respectively, the switching signal. In particular, the switch device can be designed to generate, or provide, respectively, the switching signal in response to an actuation procedure in which an external actuation force is applied to the switch device. The actuation means can be designed to transfer the actuation force to both the encoding contacts as well as to the energy conversion mechanism. The actuation means can be designed thereby to activate the energy conversion mechanism while at least one of the encoding contacts is in contact. The energy conversion mechanism can be designed to convert the mechanical energy of the actuation force into electrical energy. The encoding contacts can be designed to enable the provision of the encoded signal when in contact with the actuation means, due to the actuation force. The switch device can also include an electrical encoding circuit, which is electrically connected to the encoding contacts, and is designed to generate an individual encoded signal, depending on which of the encoding contacts is in contact with the actuation means. The encoded signal can represent information regarding which of the encoding contacts is in contact with the actuation means. The signal output mechanism can include an antenna device, in particular an antenna device pressed onto a circuit carrier, e.g. a printed circuit board. The signal output mechanism can be designed to transmit the switching signal, in a wireless manner, at an interface, to a control device, and additionally or alternatively, to at least one device that can be activated. The switch device can include an electrical circuit, which is electrically connected to both the electrical encoding circuitry, or the encoding contacts, respectively, as well as the energy conversion mechanism and the signal output mechanism.

In accordance with one embodiment, the actuation means can include a switch membrane having a plurality of switch projections. The actuation means can include at least two lever elements thereby, for activating the energy conversion mechanism. The switch membrane can be formed from an elastic deformable material. The switch projections can be designed as switch tablets, switch nubs, or suchlike, and disposed on a main surface of the switch membrane. With an actuation procedure, the switch projections can be moved into the encoding setting, independently of one another, or collectively. The arrangement and number of switch projections can correspond to that of the encoding contacts. The at least two lever elements can be tensioned in a home position thereby by an elastic element. With an actuation procedure, the at least two lever elements can be moved into the activation setting, independently of one another, or collectively. An embodiment of this type offers the advantage that with an actuation procedure, an advantageous combination of two types of actuation means is provided in order to enable the advantageous, serial actuation of the encoding contacts and the energy converter.

The switch device can also include at least one coupling element for coupling to a base plate of the wireless pushbutton. The at least one coupling element can be designed thereby to enable a pivotal movement or a linear movement of the actuation means of the switch device in relation to the base plate of the wireless pushbutton during an actuation procedure, independently of an initiation position of the actuation force in the switch device. The at least one coupling element can also be formed as a coupling section of the switch device. The at least one coupling element can be shaped as an oblong hole or suchlike thereby. The switch device can be designed to provide a switching signal when the actuation means is pivoted in relation to a base plate of the wireless pushbutton, which results in the control of a single function, or a single load. With a linear movement of the actuation means in relation to a base plate of the wireless pushbutton, the switch device can be designed to provide a switching signal that results in control of numerous functions, or loads, respectively. Such an embodiment offers the advantage that, due to the two possible types of movement, even more switching functions, or even more different switching signals, respectively, can be implemented by means of the switch device.

The actuation means can be designed to activate the energy conversion mechanism thereby, in order to activate the energy conversion mechanism in the same manner during an actuation procedure, both in the case of an actuation force initiated in a centralized manner in the switch device and well as in the case of an actuation force initiated in a decentralized manner in the switch device. The switch device can be designed thereby to provide a first tactile feedback for a user during an actuation procedure in the case of an actuation force initiated in a centralized manner in the switch device, and in the case of an actuation force initiated in a decentralized manner in the switch device, to provide a second tactile feedback for a user that differs from the first tactile feedback. An embodiment of this type offers the advantage that the energy conversion mechanism is reliably activated, independently of a contact point of an actuation force, in order to provide energy. In addition, a user receives a haptic feedback regarding the type of actuation, or a function that can be triggered thereby.

Furthermore, a circuit carrier may be provided, on which the signal output mechanism and the encoding contact are disposed. The circuit carrier can be disposed thereby in an actuation region of the switch device, in which the actuation force can be applied to the switch device. Furthermore, the energy conversion mechanism can be disposed thereby in a coupling region of the switch device, in which the switch device can be coupled to the wireless pushbutton. The circuit carrier can comprise a conductor board, a printed circuit board or suchlike. The signal output mechanism can be attached to the circuit carrier by means of methods that are typical in semiconductor technology. The circuit carrier can also include at least one electrical circuit that is electrically connected to the encoding contacts, the signal output mechanism and the energy conversion mechanism. An embodiment of this type offers the advantage that, due to the arrangement of the signal output mechanism on the circuit carrier in the actuation region of the switch device instead of in the coupling region, a low-loss emission of the switching signal is enabled.

The switch device can include thereby, from the coupling region to the actuation region, the energy conversion mechanism, the actuation means for activating the energy conversion mechanism, a housing, the circuit carrier, a spacer, and the actuation means for establishing a contact with the at least one encoding contact. The housing can be molded from a plastic. The spacer can be disposed between the circuit carrier having the encoding contacts and the actuation means for establishing contact with the at least one encoding contact. The spacer can be designed as a film or suchlike. The spacer can exhibit through holes that are designed to enable a passage of at least sub-sections of the actuation means for establishing contact with the encoding contacts. The number and arrangement of the through-holes can correspond thereby to that of the encoding contacts and actuation means. Furthermore, an actuation path of the actuation means for establishing contact with the encoding contacts can be dependent on a thickness of the spacer. An embodiment of this type offers the advantage that a space-saving arrangement of the elements of the switch device is implemented that is beneficial for the serial actuation.

In addition, the switch device can have reset springs in the actuation means for activating the energy conversion mechanism, and elastic means that are designed to tension the actuation means in a standby position in which the actuation means are spaced apart from the encoding contacts, and the energy conversion mechanism is deactivated. The actuation means are designed to remain in the standby position when no actuation force has been applied to them. An embodiment of this type offers the advantage that a defined starting position is created for actuation procedures, such that the serial actuation of the encoding contacts and energy converter can be ensured.

Furthermore, the signal output mechanism can be designed to emit a further switching signal when the actuation means return from the activation position to a standby position. The actuation means are designed to activate the energy conversion mechanism during the return movement to again generate energy while the actuation means remain in contact with the at least one encoding contact, upon which the energy conversion mechanism is deactivated, and lastly, separated from the at least one encoding contact. An embodiment of this type offers the advantage that, with the further switching signal, an end of the actuation procedure can be signaled, such that a transmitted data volume can be reduced, and energy expenditure can be decreased.

The current embodiments also relates to a wireless pushbutton having the following features:

an embodiment of the switch device specified above;

a base plate as a mount for mounting the wireless pushbutton on a carrier, wherein the base plate has at least one coupling element for coupling the switch device thereto; and a button for transferring the actuation force to the switch device, wherein the button can be attached to the switch device.

An embodiment of the switch device specified above can be implemented, or used in conjunction with the wireless pushbutton in an advantageous manner, in order to provide a switching signal. The wireless pushbutton can be designed to activate at least one external device, via the switching signal provided by means of the switch device, through wireless transmission of the switching signal. The base plate can be intended for wall mounting on plaster, or another type of surface mounting of the wireless pushbutton in a building or suchlike. Thus, the carrier is a wall or other surface, in particular, of a building. The at least one coupling element can be designed in the form of a projection, a pin, or suchlike. The at least one coupling element can also be provided as a coupling section of an integral base plate. The button be attached to the switch device in the actuation region of the switch device. The button can be designed thereby to transfer the actuation force to the actuation means of the switch device.

In accordance with one embodiment, the button can be divided into a plurality of button segments that can be actuated. The wireless pushbutton can be designed thereby to provide a switching signal from a plurality of switching signals, as a function of at least one actuated button segment. The button segments can be actuated independently, or collectively, at least in part. Thus, by way of example, at least one pair of first button segments may be provided for two different control commands to a load, and at least one second button segment may be provided for a control command to all loads that can be activated by means of the wireless pushbutton. The switch device can include thereby, in particular, a number and arrangement of encoding contacts and actuation means for establishing contact with the encoding contacts that corresponds to the number and arrangement of button segments. An embodiment of this type offers the advantage that the wireless pushbutton can be used for a variety of different switching functions, also with respect to numerous loads or devices that can be activated.

The current embodiments further relate to a method for generating a switching signal of a switch device for a wireless pushbutton during an actuation procedure of the switch device, wherein the method can be executed in conjunction with a switch device having an energy conversion mechanism, a signal output mechanism, actuation means and a plurality of encoding contacts, wherein the method includes the following steps:

provision of an encoded signal, when, with the application of a first quantity of an actuation force, the actuation means establish a contact with at least one of the numerous encoding contacts in an encoding setting;

generation of energy, when, with the application of a second quantity of an actuation force, which is greater than the first quantity, the actuation means activate the energy conversion mechanism in an activation setting; and transmission of the switching signal in a wireless manner, by means of the signal output mechanism, using the encoded signal and energy.

The method can be advantageously carried out in conjunction with the wireless pushbutton specified above, or in conjunction with the switch device specified above, in order to provide a switching signal.

The current embodiments shall be explained in greater detail in an exemplary manner, based on the attached drawings. Therein.

In the following description, identical or similar reference symbols are used for the elements depicted in the various figures and having similar functions, wherein the description of these elements shall not be repeated.

Figure 1:
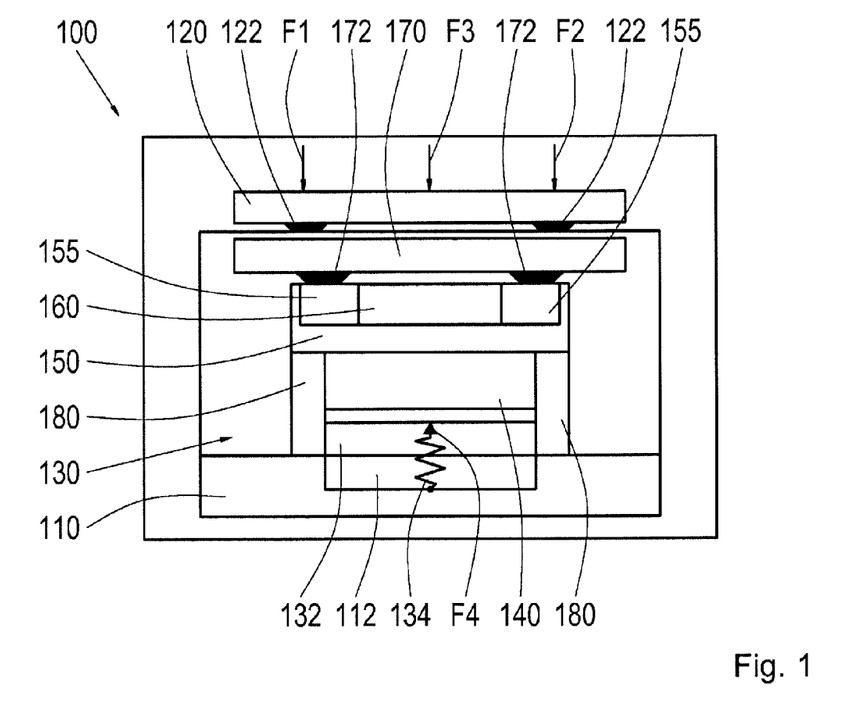
FIG. 1 shows a schematic depiction of a wireless pushbutton in accordance with an embodiment of the present invention.

FIG. 1 shows a schematic depiction of a wireless pushbutton 100. The wireless pushbutton 100 comprises a base plate, or floor plate 110, respectively, by way of example, a coupling element 112, a button 120, by way of example, two switch nubs 122, a switch device 130, or a switch module, respectively, by way of example, a coupling element 132, elastic means 134, an energy conversion mechanism 140, a circuit carrier 150, or a printed circuit board, by way of example, two encoding contacts 155, a signal output mechanism 160, by way of example, having wireless electronics and antennas, actuation means for establishing a contact, by way of example, designed in the manner of a switch membrane 170, by way of example, two switch projections 172, and actuation means for activation, by way of example, designed as two actuation levers 180. Also depicted are a first actuation force F1, which can be applied to the button 120 of the wireless pushbutton 100, or to the switch device 130, respectively, in a decentralized manner, shown in FIG. 1, by way of example, decentralized toward the left, a second actuation force F2, which can be applied to the button 120 of the wireless pushbutton 100, or the switch device 100, respectively, in a decentralized manner, shown in FIG. 1, by way of example, decentralized toward the right, a third actuation force F3, which can be applied to the button 120 of the wireless pushbutton 100, or the switch device 130, respectively, in a centralized manner, and a spring force F4 of the elastic means 134, oriented counter to the actuation forces F1, F2, and F3.

The wireless pushbutton 100 has the base plate 100 with the, by way of example, one coupling element 112, the button 120 having the, by way of example, two switch nubs 122, and the switch device 130. The base plate 110 is a mounting base for mounting the wireless pushbutton 100 on a carrier, such as a wall or suchlike. The base plate 110 also has at least one coupling element 112 for coupling the switch device 130 to the base plate 110. The switch device 130 is disposed between the base plate 110 and the button 120. As depicted in FIG. 1, the energy conversion mechanism 140 is disposed between the actuation levers 180 as well as between the base plate 110 and the circuit carrier 150. The circuit carrier 150, having the encoding contacts 155 and the signal output mechanism 160 is disposed between the switch membrane 170 having the switch projections 172 and the energy conversion mechanism 140, as well as the actuation levers 180. The switch membrane 170 is disposed between the circuit carrier 150 and the button 120.

The button 120 is designed for transferring an actuation force to the switch device 130, in particular to the switch membrane 170, a housing of the switch device 130, the circuit carrier 150 and the actuation lever 180. The switch nubs 122 are also designed thereby to transfer the actuation force to the switch device 130, in particular to the switch membrane 170. The button 120 can be attached to the switch device 130, in particular on a housing of the switch device 130.

The switch device 130 includes the exemplary one coupling element 132, the energy conversion mechanism 140, the circuit carrier 150, the exemplary two encoding contacts 155, the signal output mechanism 160, the switch membrane 170, the exemplary two switch projections 172 and the actuation lever 180. The coupling element 132 can be coupled to the coupling element 112 of the base plate 110, in order to fasten the switch device 130 to the base plate 110. The energy conversion mechanism 140 is designed to convert the mechanical energy introduced by the actuation force into electrical energy. By way of example, two encoding contacts 155 and the signal output mechanism 160 are disposed on the circuit carrier 150. The switch membrane 170 has the exemplary two switch projections 172. The switch projections 172 are disposed on the switch membrane 170 thereby. The switch membrane 170 and the actuation lever 180 represent the actuation means of the switch device 130.

With an actuation procedure of the wireless pushbutton 100, an external actuation force is applied to the button 120. The actuation force is transferred from the button 120 with the switch nubs 122 to the switch membrane 170, a housing of the switch device 130, the circuit carrier 150 and the actuation lever 180. The actuation means, which include the switch membrane 170 and the actuation lever 180, are designed to establish a contact with at least one of the numerous encoding contacts 155 in an encoded setting when, in an actuation procedure of the switch device 130, a first quantity of an actuation force is applied thereto, in order to provide an encoded signal. Due to the actuation force, at least one of the switch projections 172 of the switch membrane 170 ends up in contact with at least one of the encoding contacts 155 of the circuit carrier 150. The actuation means are also designed to activate the energy conversion mechanism 140 when, during an actuation procedure of the switch device 130, a second quantity of the actuation force, which is greater than the first quantity, is applied thereto in an activation setting, in order to generate electrical energy. At least one of the actuation levers 180 activates the energy conversion mechanism 140 thereby, due to the actuation force, such that electrical energy is generated. The signal output mechanism 160 is designed to emit a switching signal in a wireless manner, using the encoded signal and the electrical energy.

According to one exemplary embodiment, the button 120 is divided into a plurality of button segments that can be actuated, wherein the wireless pushbutton 100 is designed to provide one of a plurality of different switching signals, depending on at least one actuated button segment. Each of the button segments is allocated to at least one switch nub thereby, by way of example. In accordance with one exemplary embodiment, the coupling element 132 of the switch device 130 is designed to enable a pivotal movement, and additionally or alternatively, a linear movement, of the actuation means 170, 180 of the switch device 130 in relation to the base plate 110 of the wireless pushbutton 100 during an actuation procedure. The elastic means 134 are designed thereby to tension the switch device 130, in particular the actuation means 170, 180, in a standby position, by means of the spring force F4, in which the actuation means 170, 180 are at a spacing to the encoding contacts 155, and the energy conversion mechanism 140 is deactivated. In accordance with one exemplary embodiment, the signal output mechanism 150 is designed to emit a further switching signal when the actuation means 170, 180 are returned from the activation position to a standby position.

When the third actuation force F3 is applied in a centralized manner to the button 120 of the wireless pushbutton 100, or to the switch device 130, respectively, both actuation levers 180, by way of example, are actuated. When the second actuation force F2, for example, is applied to the button 120 of the wireless pushbutton, or the switch device 130, respectively, on the right, in a decentralized manner, the actuation lever 180, in particular, depicted on the right in FIG. 1, is actuated.

Figure 2:
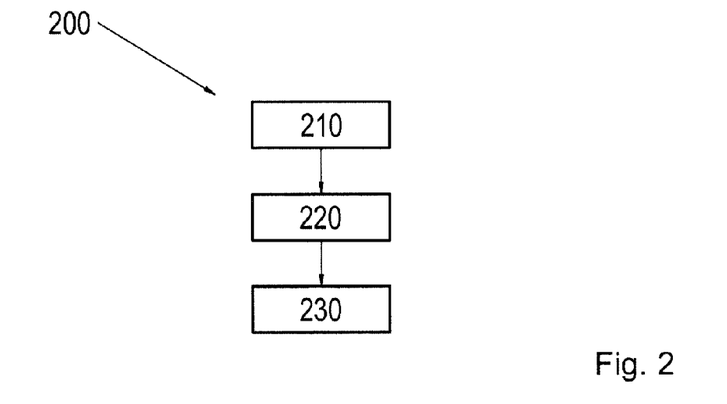
FIG. 2 shows a flow chart for a method for generating a switching signal in accordance with an embodiment of the present invention.

FIG. 2 shows a flow chart for a method 200 for generating a switching signal of a switch device for a wireless pushbutton during an actuation procedure of the switch device in accordance with the current embodiments. The method 200 can be carried out in conjunction with a switch device that includes an energy conversion mechanism, a signal output mechanism, actuation means, and a plurality of encoding contacts. Thus, the method 200 can be advantageously carried out in conjunction with one of the switch devices and/or wireless pushbuttons form FIG. 1 or FIGS. 3 to 8.

The method 200 comprises a step 210 for providing an encoded signal when contact is made with at least one of the plurality of encoding contacts when a first quantity of an actuation force is applied to the actuation means in an encoding setting. Furthermore, the method 200 comprises a step 220 for generating energy, when the actuation means activate the energy conversion mechanism into an activation setting, when a second quantity of an actuation force, which is greater than the first quantity, is applied. The method 200 also has a step 230, for emitting the switch signal in a wireless manner, by means of the signal output mechanism, using the encoded signal and the energy.

Figure 3:
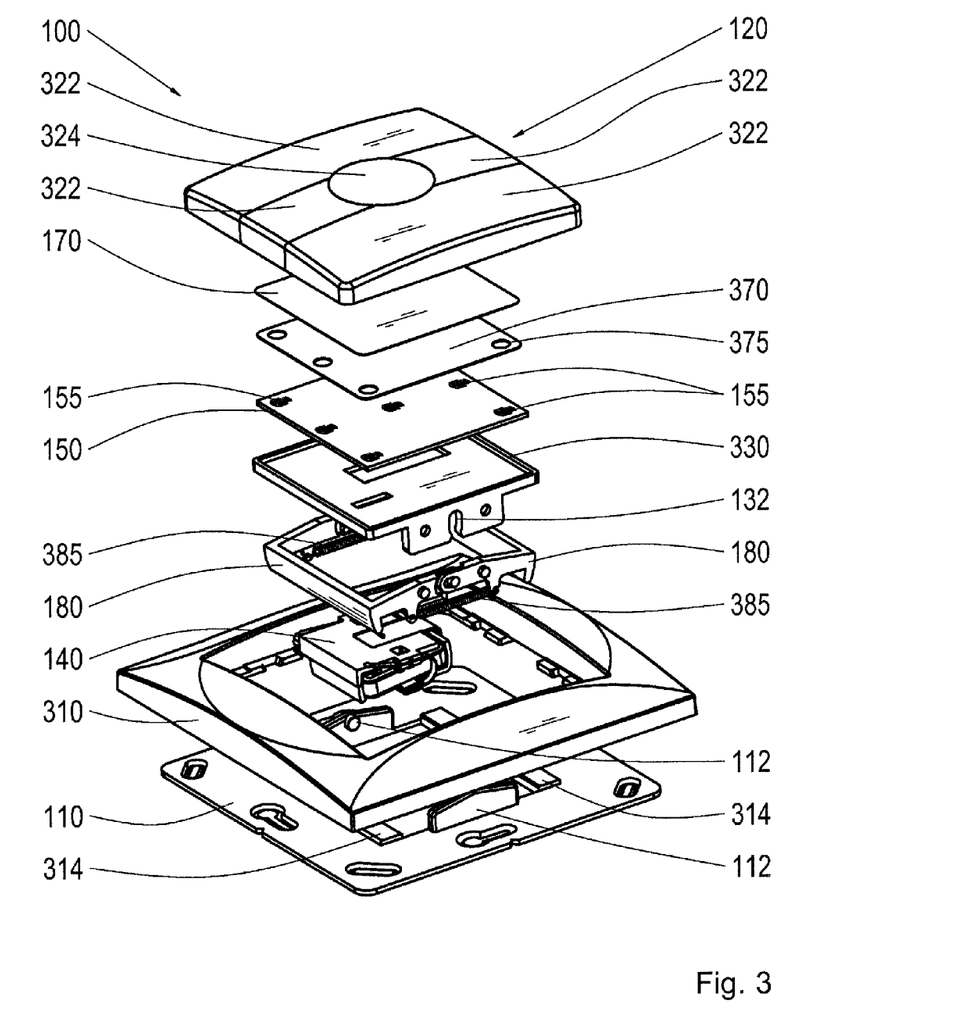
FIG. 3 shows a perspective, exploded depiction of a wireless pushbutton in accordance with an embodiment of the present invention.

FIG. 3 shows a perspective, exploded depiction of a wireless pushbutton 100 in accordance with the current embodiments. The wireless pushbutton 100 is a wireless pushbutton, for example, like the wireless pushbutton shown in, and described in reference to, FIG. 1. The wireless pushbutton 100 according to the embodiment shown in FIG. 3 comprises a base plate 110, by way of example, two coupling elements 112, by way of example, designed in the manner of pins disposed on crosspiece projections, a button 120, by way of example, two coupling elements 132, by way of example, designed as oblong holes, of which only one is shown, due to the nature of the illustration, an energy conversion mechanism 140, a circuit carrier 150, by way of example, seven encoding contacts 155, of which only five are shown, due to the nature of the illustration, actuation means for establishing a contact, by way of example, designed as a switch membrane 170, actuation means for activating, designed as two actuation levers 180, by way of example, a switch frame 310, two actuation regions, or contact sections 314 of the base plate base plate 110, by way of example, four first button segments 322, by way of example, a second button segment 324, a housing 330, a spacer film 370, by way of example, seven through holes 375, of which only four are shown, due to the nature of the illustration, and by way of example, two return springs 385.

In the exploded depiction in FIG. 3, viewed from the base plate 110 toward the button 120, the wireless pushbutton 100 has, in this order, the base plate 110 with the coupling elements 112, the switch frame 310, the energy conversion mechanism 140, the actuation lever 180 with the return springs 385, the housing 330 with the coupling elements 132, the circuit carrier 150 with the encoding contacts 155, the spacer film 370 with the through holes 375, the switch membrane 170 and the button 120 with the first button segments 322 and the second button segment 324. The energy conversion mechanism 140, the actuation lever 180 with the return springs 385, the housing 330 with the coupling elements 132, the circuit carrier 150 with the encoding contacts 155, the spacer film 370 with the through holes 375 and the switch membrane 170 represent thereby a switch device like the switch device from FIG. 1.

The base plate 110 with, by way of example, a square outline, has holes through which attachment means can be inserted, such as screws or suchlike. The base plate 110 can be connected, e.g., by means of screwing or adhesive, directly to plaster, furniture parts, tiles, glass, door panels or suchlike. Furthermore, the base plate 110 has an interface designed as coupling elements 112 for receiving the switch device, or the self-sufficient switch module. The coupling elements 112 are formed as an integral part of the base plate 110 thereby. Furthermore, the base plate 110 includes the contact sections 314, which interact with the actuation levers 180 of the switch device. The contact sections 314 are designed thereby to act as contact elements for the actuation lever 180 of the switch device. The actuation levers 180 of the switch device can be brought into contact with the contact section 314 of the base plate 110.

The switch frame 310 can be attached to the base plate 110. The switch frame 310 can be attached directly to the base plate 110 by means of a locking connection thereby, using a locking ring or by means of any type of a snap fit connection. The wireless pushbutton 100 has an optional locking ring thereby, in accordance with one exemplary embodiment, for securing the switch frame 310.

The button 120 is designed, in accordance with the embodiment depicted in FIG. 3, as a five-way divided button for controlling, for example, three light sources, blinds, curtains or suchlike, with a round, central button segment 325, e.g. for an "all out" function. According to another exemplary embodiment, the button 120 is designed, e.g. as a single button for a single switching function, as an undivided button for a double function, or as a button that is divided into two or more segments, for numerous functions.

The housing 330 includes the coupling elements 132, which are designed, by way of example, as two oblong holes. According to one exemplary embodiment, the housing 330 has a cover, for protecting individual components encompassed therein. The cover and the housing 330 are locked together thereby by means of a snap connection. A wireless module of the switch device can be accommodated, at least in part, in the housing 330, which comprises the circuit carrier 150, the energy conversion mechanism 140, a mechanism for energy management, an energy storage device, a mechanism for switch encoding, a wireless electronics unit and a signal output mechanism. The wireless module is implemented on the circuit carrier 150. The circuit carrier 150 is, in particular, a printed circuit board. Furthermore, the encoding contacts 155, or the encoding switch, respectively, is integrated in a layout of the circuit carrier 150. Thus, switch surfaces, or switch structures, for the encoding contacts 155, an energy management, a wireless electronics system, and, for example, a printed antenna as a signal output mechanism, are disposed on the circuit carrier 150.

The energy conversion mechanism 140 has an appropriate electromagnetic energy converter. The energy conversion mechanism 140 can be activated by means of the actuation lever 180. The actuation lever 180 is a coupled double lever mechanism having two return springs 385, for example. The double lever mechanism comprises the actuation lever 180 as two symmetrically formed and disposed levers that are mechanically coupled to one another and pretensioned in a standby position by means of the return springs 385. The double lever mechanism, or the actuation levers 180, is designed such that an activation of the energy conversion mechanism 140, or the generator, respectively, can be implemented through actuation of a first, second, or even both actuation levers 180. The return springs 385 include, e.g., tension springs, compression springs, torsion springs, spiral springs, or suchlike. The energy conversion mechanism 140 can establish a contact to the circuit carrier 150 by means of pressure contacts or another connecting technology, through openings in the housing 330.

An encoding system, or switching system of the switch device is implemented, in particular, by positioning the encoding contacts 155 at a main surface of the circuit carrier 150 facing the switch membrane 170. Switch projections, or switch tablets, are disposed on the switch membrane 170, aligned in terms of their configuration to the encoding contacts 155 on the circuit carrier 150. The spacing film, or spacer film, is located between the circuit carrier 150 and the switch membrane. The spacer film 370 has one of the through holes 375 in the region of each switch projection, or each encoding contact 155. When a switching process is occurring, at least one of the switch projections of the switch membrane 170 is pushed through at least one through hole 375 in the spacer film 370, and bridges the switching structure on the circuit carrier 150. An actuation during an actuation procedure can be adjusted by means of a thickness of the spacer film 370. The encoding contacts 155 are implemented, in accordance with one embodiment example, by means of an alternative switching technology, such as a rubber mat, for example.

The coupling elements 112, in the design of two attachment crosspieces with pins, are disposed in a central region of the base plate 110, and represent one receiving possibility and rotational axis for the switch device. The switch device can be locked onto the coupling elements 112, in particular the pins, of the base plate 110 by means of the coupling elements 132 designed as partially open oblong holes in the lateral walls of the housing 330. Due to the position of the pins inside the oblong holes, the switch device can perform both a rotational movement as well as a linear movement in relation to the base plate 110. Two wire springs, by way of example, are disposed in lateral sections, or lateral walls, respectively, of the switch device, integrated therein, for example, which hold the switch device away from the base plate 110 in a tensioned manner.

The button 120 divided into the button segments 322, 324, is locked in place on the switch device. In particular, the button 120 is connected to the switch device such that small relative movements of individual button segments 322, 324 of the button 120 in relation to the switch device, in particular linear movements as well, are possible. In other words, the button 120 is supported in a floating manner on the switch device. Switch nubs or actuation nubs are disposed on the inside of the button 120, which are assigned to the switch projections, or switch tablets of the switch device 170 and the encoding contacts 155 of the circuit carrier 150.

Figure 4:
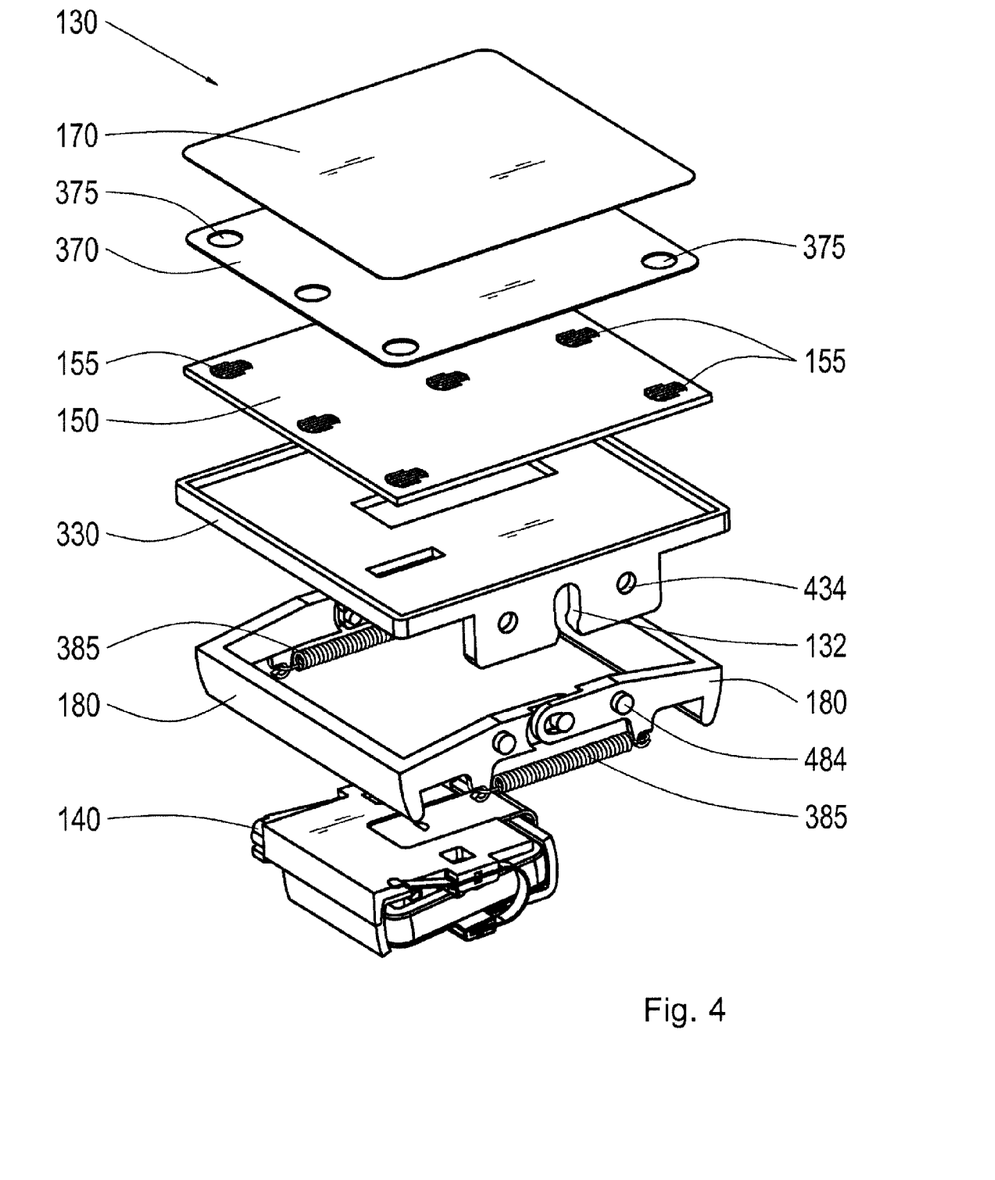
FIG. 4 shows a perspective, exploded depiction of the switch device of the wireless pushbutton from FIG. 3.

FIG. 4 shows a perspective exploded depiction of the switch device 130 of the wireless pushbutton from FIG. 3. Thus, the energy conversion mechanism 140, the actuation levers 180 with the return springs 385, the housing 330 with the coupling elements 132, the circuit carrier 150 with the encoding contacts 155, the spacer film 370 with the through holes 375 and the switch membrane are shown in FIG. 4. Furthermore, snap holes 434 of the housing are depicted in FIG. 4, which can be snapped onto the snap projections 484 of the actuation lever 180, in order to secure the actuation lever 180 on the housing 330.

Figure 5:
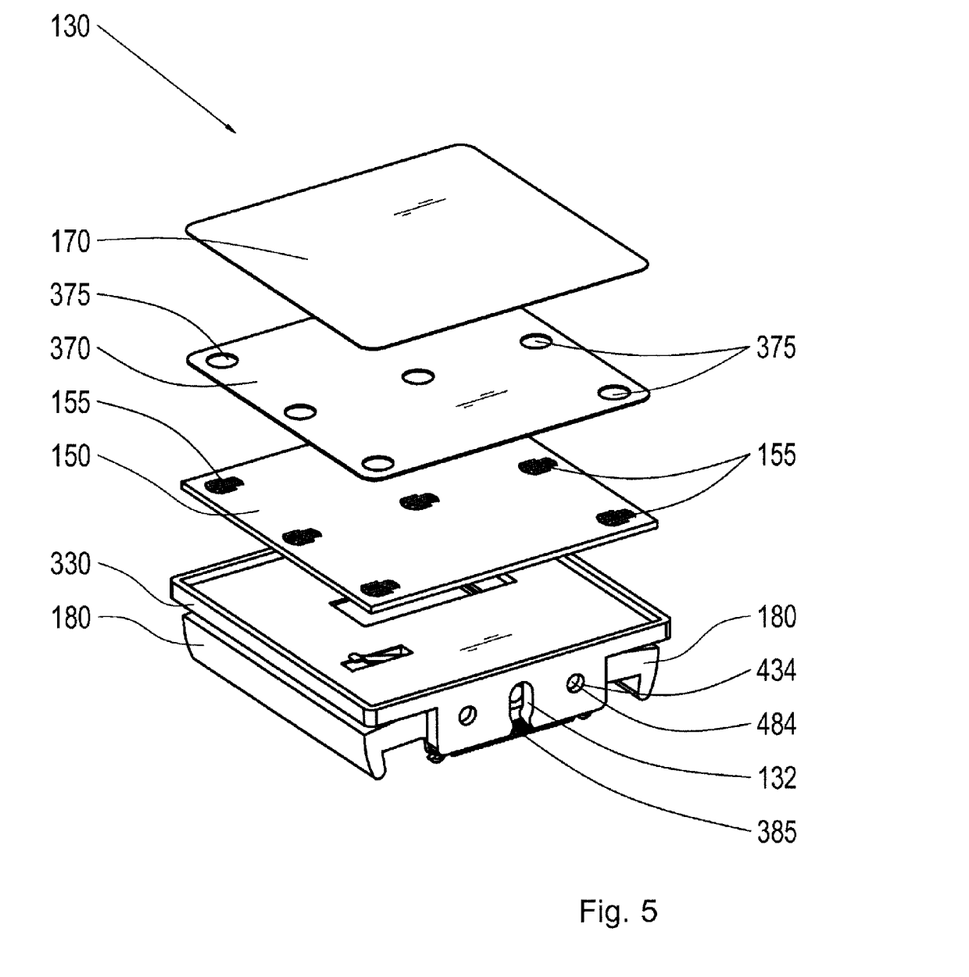
FIG. 5 shows a perspective, partially exploded depiction of the switch device of the wireless pushbutton form FIG. 3.

FIG. 5 shows a perspective partially exploded depiction of the switch device 130 of the wireless pushbutton from FIG. 3. The depiction in FIG. 5 corresponds thereby to the depiction in FIG. 4, with the exception that the energy conversion mechanism is covered, due to the nature of the illustration, by the housing 330 and the actuation levers 180, and the actuation levers 180 are depicted attached to the housing 330.

Figure 6A:
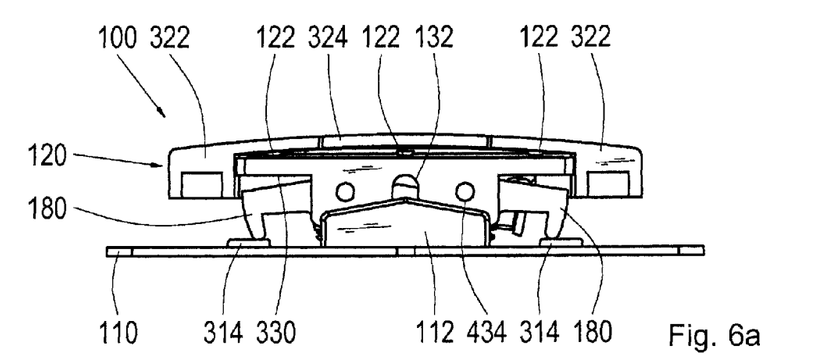
FIGS. 6A to 6C show sectional depictions of the wireless pushbutton from FIG. 3 in an assembled state thereof.
Figure 6B:
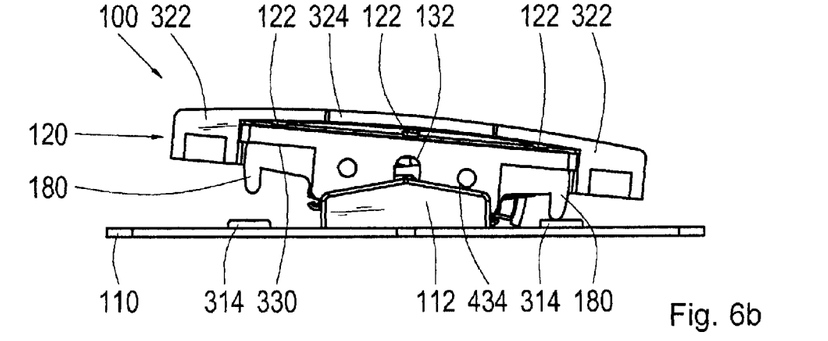
Figure 6C:
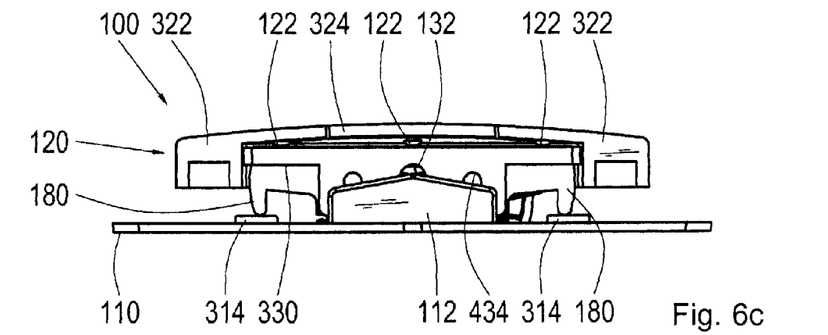

FIGS. 6A to 6C show sectional depictions of the wireless pushbutton 100 from FIG. 3 in an assembled state thereof, in various stages of an actuation procedure. Of the wireless pushbutton 100, the base plate 110 with the coupling elements 112 and the contact sections 314, the actuation levers 180, the housing 330 with the coupling elements 132 and the snap holes 434, the button 120 with the switch nubs 122, the first button segments 322 and the second button segments 324 are shown thereby in FIGS. 6A to 6C, depending on the nature of the illustration. Thus, the energy conversion mechanism, the circuit carrier with the encoding contacts, the spacer film and the switch membrane are hidden, due to the nature of the illustration, and the switch frame is omitted in FIGS. 6A to 6C. FIG. 6A shows the wireless pushbutton 100 in a standby position thereby, with no actuation force acting thereon, FIG. 6B shows the wireless pushbutton 100 in an actuation position, in which an actuation force acts on one of the first button segments 322, and FIG. 6C shows the wireless pushbutton 100 in an actuation position, in which an actuation force acts on the second button segment 324.

In FIG. 6A the two actuation levers 180 of the switch device press, or rest, against the contact sections 314 of the base plate 110 at substantially the same time, or to the same extent, and place the switch device in the standby position.

In FIG. 6B, when the button 120, or the first, for example, button segment 322 on the right side in the depiction in FIGS. 6A to 6C, respectively, is actuated with a first quantity of actuation force, the right, first button segment 322 of the button 120 is depressed, and presses with its allocated switch nub 122 the switch membrane of the switch device. The allocated encoding contact on the circuit carrier is short circuited by means of the switch tablet of the switch membrane and a corresponding encoding of the electronics is thus generated.

With further actuation, or with a second quantity of the actuation force, which is greater than the first quantity, the actuation lever 180 depicted on the right in FIGS. 6A to 6C is caused to move and the switch device, as well as the button 120, tilt, or pivot, in the clockwise direction, as is shown in FIG. 6B. The actuation lever 180 on the right in FIGS. 6A to 6C presses, or rests, thereby, on the contact section 314 of the base plate 110 depicted on the right in FIGS. 6A to 6C, and the actuation lever 180 depicted on the left in FIGS. 6A to 6C is spaced apart from the contact section 314 of the base plate 110 depicted on the left in FIGS. 6A to 6C. The corresponding encoding contact remains engaged during the actuation procedure. With a pivotal movement or tilting movement that can be defined in this manner, the energy conversion mechanism is activated by the right-hand actuation lever 180.

The wireless electronics, in particular the signal output mechanism, or antenna, is supplied with energy. A logic component of the switch device generates a command assigned to the encoding, and a wireless electronics causes the transmission of the corresponding switching signal, by radio signals, to a receiver. When the button 120 is released, the switch device returns to the standby position. A further switching signal is generated during the return.

In the case of an actuation of the first button segment 322 on the left side in FIGS. 6A to 6B, an encoding occurs using a left-hand encoding contact. The switch device tilts to the left and the energy conversion mechanism is activated by the left-hand actuation lever 180.

A switch actuation of the central segment of the button 120, thus the second button segment 324, occurs in FIG. 6C. A linear movement of the switch device and the button 120 in relation to the base plate occurs thereby. Both an oblong hole spring, or elastic means of an oblong hole guide, for tensioning the coupling elements 132, as well as the return springs of the actuation levers 180, are deflected thereby in relation to the coupling elements 112. Both actuation levers 180 of the switch device press, or rest, substantially at the same time, or to the same extent, against the contact sections 314 of the base plate 110 thereby. A switching signal, or radio command, respectively, is transmitted thereby by means of the switch device, in order to effect a function, "all off" for example, at a receiver. By way of example, blinds or lamps in a building can be centrally controlled thereby. The spring forces of the encoding contacts, the actuation levers 180, and the oblong hole springs can be adapted thereto in an appropriate manner. It is advantageous thereby to be able to provide a central function, "all out" or "all on," in addition to the other switch functions thereby. When leaving a building, for example, with the switching option depicted in FIG. 6C, all of the light sources can be switched off, or on, respectively, with one button.

Another advantage is obtained through the placement of the circuit carrier in the wireless pushbutton 100 adjacent to the button 120. Because the signal output mechanism can be pressed directly onto a main surface of the circuit carrier facing the button 120, a low-loss transmission of the switching signal is possible.

Figure 7:
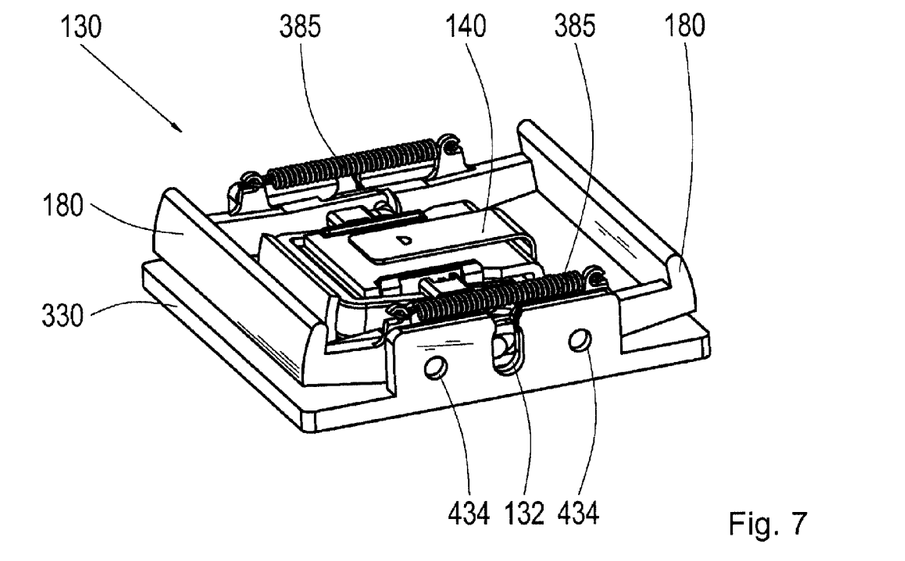
FIG. 7 shows a perspective depiction of the switch device of the wireless pushbutton form FIG. 3 in an assembled state thereof.

FIG. 7 shows a perspective depiction of the switch device 130 of the wireless pushbutton from FIG. 3 in an assembled state thereof, seen from below. The energy conversion mechanism 140, the actuation levers 180 with the return springs 385, as well as the housing with the coupling elements 132 and the snap holes 434 are shown in FIG. 7 thereby. Due to the nature of the illustration, the circuit carrier with the encoding contacts, the spacer film with the through holes, and the switch membrane with the switch projections are hidden in FIG. 7.

Figure 8:
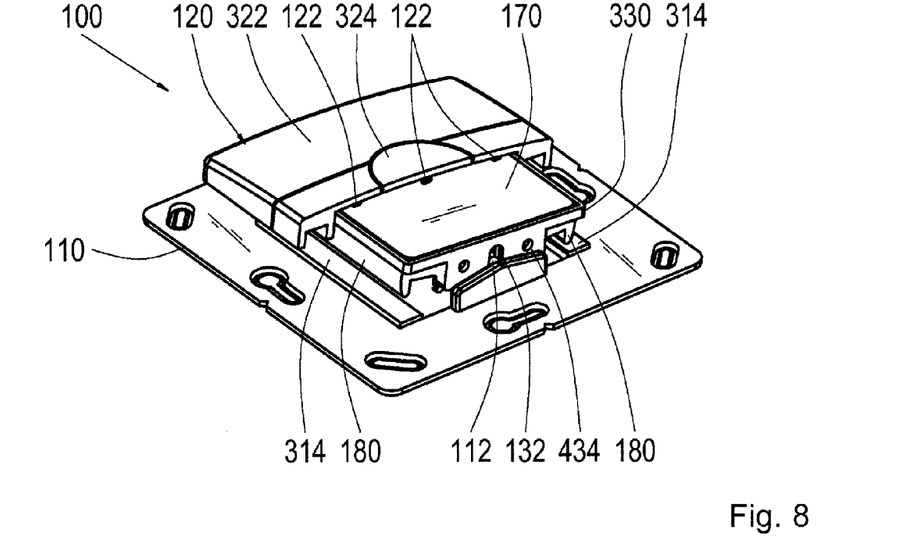
FIG. 8 shows a perspective partial section depiction of the wireless pushbutton from FIG. 3 in an assembled state thereof.

FIG. 8 shows a perspective sectional depiction of the wireless pushbutton 100 from FIG. 3 in an assembled state thereof, viewed from an angle. The switch frame is omitted thereby in the depiction, and the button 120 is shown in a cutaway. Thus, from the wireless pushbutton 100, the base plate 110 with the coupling elements 112 and the contact sections 314, the actuation levers 180, the housing 330 with the coupling elements 132 and the snap holes 434, the button 120 with the switch nubs 122, a first button segment 322, and the second button segment 324 are depicted in FIG. 8.

The exemplary embodiments described herein and shown in the figures are selected only by way of example. Different exemplary embodiments can be combined with one another, entirely or with respect to individual features. Moreover, one exemplary embodiment can be supplemented with features of another exemplary embodiment. Furthermore, method steps according to the current embodiments may be repeated, as well as executed in sequences differing from those described herein.

If an exemplary embodiment comprises an "and/or" conjunction between a first feature and a second feature, then this can be read to mean that the exemplary embodiment includes both the first feature as well as the second feature in accordance with one exemplary embodiment, and includes either just the first feature or just the second feature in accordance with a second exemplary embodiment.

REFERENCE SYMBOLS 100 wireless pushbutton
110 base plate
112 coupling element, or attachment crosspiece with pins
120 button
122 switch nubs
130 switch device, or switch module
132 coupling element, or oblong hole
134 elastic means
140 energy conversion mechanism
150 circuit carrier, or printed circuit board
155 encoding contact
160 signal output mechanism with radio electronics and antenna
170 actuation means for contacts or switch membrane
172 switch projections or switch tablets
180 actuation means for activation, or actuation levers
F1 first actuation force, that can be exerted on the switch device in a decentralized manner
F2 second actuation force, that can be exerted on the switch device in a decentralized manner
F3 third actuation force, that can be exerted on the switch device at the center thereof
F4 spring force of the elastic means
200 method for generating
210 provision step
220 generation step
230 output step
310 switch frame
314 contact section of the base plate
322 first button segment
324 second button segment
330 housing
370 spacer or spacer film
375 through hole
385 return spring
434 snap hole
484 snap projection

The invention claimed is:

1. A switch device for a wireless pushbutton, wherein the switch device comprises:
an energy conversion mechanism;
a signal output mechanism;
an actuation device; and
a plurality of encoding contacts,
wherein the actuation device is configured to establish contact with at least one of the plurality of encoding contacts when a first quantity of an actuation force is applied for generating an encoded signal,
wherein the actuation device is configured to activate the energy conversion mechanism to generate energy when a second quantity of an actuation force greater than the first quantity is applied to the activation device, and
wherein the signal output mechanism is configured to transmit a wireless output signal using the encoded signal when the energy conversion mechanism is activated.

2. The switch device according to claim 1, wherein the actuation device includes a switch membrane having a plurality of switch projections for establishing a contact with at least one of the plurality of encoding contacts, and wherein the actuation device includes at least two lever elements configured to activate the energy conversion mechanism.

3. The switch device according to claim 1, further comprising at least one coupling element for coupling with a base plate of the wireless pushbutton, wherein the at least one coupling element is designed to enable a pivotal movement or a linear movement of the actuation device in relation to the base plate.

4. The switch device according to claim 3, wherein the energy conversion mechanism is configured to activate to generate energy when the second quantity of the actuation force is applied to a centralized portion of the actuation device or a decentralized portion of the actuation device.

5. The switch device according to claim 1, wherein the encoding contacts are disposed on a circuit carrier, and wherein the circuit carrier is disposed in an actuation region of the switch device such that the first quantity of the actuation force can cause contact between the actuation device and the encoding contacts.

6. The switch device according to claim 4, wherein a housing, a circuit carrier, and a spacer are disposed between the energy conversion mechanism and the actuation device, and wherein the spacer is configured for establishing the contact between the at least one encoding contact and the actuation device.

7. The switch device according to claim 1, wherein the actuation device comprises a spring configured to influence the activation means into a standby position, the actuation means being spaced apart from the encoding contacts in the standby position.

8. The switch device according to claim 1, wherein the signal output mechanism is configured to transmit a second output signal during a return movement of the actuation device from an activation position to a standby position.

9. A wireless pushbutton comprising:
a switch device, the switch device having:
an energy conversion mechanism;
a signal output mechanism;
an actuation device; and
a plurality of encoding contacts,
wherein the actuation device means is configured to establish contact with at least one of the plurality of encoding contacts when a first quantity of an actuation force is applied for generating an encoded signal,
wherein the actuation device is configured to activate the energy conversion mechanism to generate energy when a second quantity of an actuation force greater than the first quantity is applied to the activation device, and wherein the signal output mechanism is configured to transmit a wireless output signal using the encoded signal when the energy conversion mechanism is activated; and a base plate serving as a mount for mounting the wireless pushbutton on a carrier, wherein the base plate includes:

at least one coupling element for coupling to the switch device; and a button for transferring an actuation force- to the switch device, wherein the button is coupled to the switch device.

10. The wireless pushbutton according to claim 9, wherein the button is divided into a plurality of actuatable button segments, wherein the wireless pushbutton is designed to generate one of a plurality of different switching signals in response to the actuation force applied to at least one actuated button segment.

11. The wireless pushbutton according to claim 9, wherein the actuation device includes a switch membrane having a plurality of switch projections for establishing a contact with at least one of the plurality of encoding contacts, and wherein the actuation device includes at least two lever elements configured to activate the energy conversion mechanism.

12. The wireless pushbutton according to claim 9, wherein the at least one coupling element is designed to enable a pivotal movement or a linear movement of the actuation device of the switch device in relation to the base plate.

13. The wireless pushbutton according to claim 9, wherein the encoding contacts are disposed on a circuit carrier, and wherein the circuit carrier is disposed in an actuation region of the switch device such that the first quantity of the actuation force can cause contact between the actuation device and the encoding contacts.

14. A method for generating a switching signal with a switch device for a wireless pushbutton comprising:

generating an encoded signal with an actuation device when a contact is established between the actuation device and at least one of a plurality of encoding contacts when a first quantity of an actuation force is applied to the actuation device in an encoding setting;

generating energy with an energy conversion mechanism when a second quantity of the actuation force, which is greater than the first quantity, is applied to the actuation means in an activation setting; and generating a wireless output signal with a signal output mechanism, using the encoded signal when the energy conversion mechanism is activated.

15. The method according to claim 14, wherein the plurality of encoding contacts are disposed on a circuit carrier, and wherein the circuit carrier is disposed in an actuation region of the switch device such that the actuation force can be transferred to the actuation device.

16. The method according to claim 14, wherein the actuation device comprises a spring configured to influence the activation device into a standby position, the actuation means being spaced apart from the encoding contacts in the standby position.

17. The method according to claim 14, further comprising generating a second output signal with the signal output mechanism during a return movement of the actuation device from an activation position to a standby position.

18. The method according to claim 14, wherein the actuation device includes a switch membrane having a plurality of switch projections for establishing a contact with at least one of the plurality of encoding contacts.

19. The method according to claim 14, further comprising a pivotal movement or a linear movement of the actuation device in response to the actuation force.

20. The method according to claim 14, wherein the energy conversion mechanism is configured to activate to generate energy when the second quantity of the actuation force is applied to a centralized portion of the actuation device or a decentralized portion of the actuation device.

* * * * *